United States Patent [19]

Sieglaff et al.

[11] 4,097,657

[45] Jun. 27, 1978

[54] SURFACE-TREATED SOFT CONTACT LENSES

[75] Inventors: Charles L. Sieglaff, Mentor; Charles J. Hora, Willoughby Hills; Joseph P. Tiefenbach, Mentor, all of Ohio

[73] Assignee: Diamond Shamrock Corporation, Cleveland, Ohio

[21] Appl. No.: 674,448

[22] Filed: Apr. 7, 1976

[51] Int. Cl.$^2$ .......................... C08F 8/32; C08F 8/34
[52] U.S. Cl. ..................................... 526/30; 351/160; 526/52.2; 526/52.3; 526/52.5; 526/55
[58] Field of Search ................. 526/52.5, 52.2, 30; 351/160

[56] References Cited

U.S. PATENT DOCUMENTS

| 3,471,460 | 10/1969 | Rees | 260/88.1 |
|---|---|---|---|
| 3,528,958 | 9/1970 | Achorn | 260/94.9 |
| 3,769,261 | 10/1973 | Clampett et al. | 260/49.5 R |
| 3,951,528 | 4/1976 | Leeds | 351/160 X |
| 3,957,740 | 5/1976 | Blank et al. | 351/160 X |

*Primary Examiner*—William F. Hamrock
*Attorney, Agent, or Firm*—Helen P. Brush

[57] ABSTRACT

Polymer hydrogels adapted for use as soft contact lenses are treated to provide at least on the surfaces thereof a modified, less hydrophilic polymeric structure inhibiting penetration by bacteria and proteins, whereby development of clouding and discoloration of the lens material is significantly retarded.

8 Claims, No Drawings

SURFACE-TREATED SOFT CONTACT LENSES

BACKGROUND OF THE INVENTION

1. Field of the Invention

This invention relates to hydrophilic plastic materials useful as soft contact lenses, and more particularly relates to treatment of said hydrophilic soft contact lenses to make them more resistant to clouding and discoloration in use.

2. The Prior Art

It has long been known to fabricate contact lenses from rigid materials such as glass and clear plastics, e.g., essentially hydrophobic acrylic-type polymers as polymethylmethacrylate and the like. Although more safely handled and used than glass, such hydrophobic plastic materials have been only moderately successful as contact lenses, being too hard and uncomfortable to the wearer. More recently, contact lens compositions have been developed from hydrophilic-type polymers which are softer and generally more easily accommodated by the eye. Thus, the use of hydrophilic polymer lens compositions is becoming of increasing importance in opthalmological practice.

Hydrophilic polymers useful as soft contact lenses typically are lightly cross-linked copolymers derived from one or more hydroxyl-group containing monomers. In their hydrated state, these polymers are known generally in the art as "hydrogels". Hydrogels are specifically defined as coherent, three-dimensional polymer structures or networks which have the ability to absorb or imbibe large quantities of water without dissolution. At the present time, the specific class of polymer hydrogels which have gained particular commercial acceptance as soft contact lenses are those derived from acrylic esters. U.S. Pat. Nos. 2,976,576 and 3,220,960, issued to O. Wichterle and D. Lim on Mar. 28, 1961 and on Nov. 30, 1965, respectively, are early patents which describe the use of acrylic ester hydrogels for the manufacture of soft contact lenses. Many subsequent patents as well as other technical articles are directed to the preparation of numerous other acrylic ester-type hydrogels which differ primarily in the type and/or percentage of comonomers contained therein.

In the main, acrylic ester hydrogels are all derived by copolymerizing a major amount of a water-soluble monoester of acrylic or methacrylic acid in which the ester moiety contains at least one hydrophilic group and a minor amount of a bifunctional diester of acrylic or methacrylic acid which cross links the hydrophilic group-containing monomer as it polymerizes.

Although presently used contact lenses fabricated from polymer hydrogels are much softer than the prior hard contact lenses and can be accomodated by the wearer with relatively little discomfort, they nevertheless have disadvantageous properties and likewise have not been completely satisfactory. Hydrogel lenses favor the growth of pathological bacteria and fungi on their surfaces. If the lenses are not regularly cleaned and sterilized, or if they are stored in contaminated solutions, the pathogens can be easily sorbed by the lens material due to its flexible, hydrophilic polymer structure. Corneal-damaging chemical residues from improper cleaning and/or sterilization techniques can likewise be introduced into the lens material in this way. Also, because of its aforesaid flexible, hydrophilic polymer structure, proteins and other normal substances in the eye environment can be easily diffused through the lens with use. Accumulation of such substances in the lens causes its discoloration and clouding with repeated cleaning and sterilization techniques practiced by the wearer. Further, the lenses can lose sufficient amounts of water during use to deleteriously affect their dimensional stability and optical acuity.

It is an object of this invention, therefore, to provide a soft contact lens which is resistant to penetration by pathological organisms and chemicals damaging to the eye, while simultaneously transmitting other substances beneficial thereto.

It is another object of this invention to provide a soft contact lens wherein the diffusion of proteins and other migratory eye substances is significantly inhibited so as to lengthen its life and optical effectiveness.

It is still a further object of this invention to provide a soft contact lens which will retain a sufficient quantity of water during use to maintain its dimensional stability and optical acuity.

These and other objects of this invention will become apparent to those skilled in the art from the description of the invention which follows.

SUMMARY OF THE INVENTION

The present invention comprises treating a polymer hydrogel to be used as a soft contact lens with a compound which will modify the polymeric structure comprising the lens and reduce its porosity or make it of a less hydrophilic nature. The desired modification of the polymer structure is effected, for example, through further cross-linking of the hydrogel polymer molecules and/or by the attachment of less hydrophilic groups provided by the modifying compound onto the hydrogel polymer chains. Treatment of the hydrogel is conducted for a sufficient period of time to effect structural modification of at least a major portion of those polymer molecules on the outer surfaces of the lens so as to provide thereto a barrier against penetration by proteins and pathological organisms. With improved resistance to protein diffusion, the treated lenses of this invention become significantly resistant to clouding and discoloration in use, and their service life is greatly extended. Thus, the process of this invention and the improved contact lenses produced thereby represent a substantial savings in replacement costs to the user.

DESCRIPTION OF THE PREFERRED EMBODIMENTS

In general, any polymer hydrogel which contains a polar functional group capable of reacting with an appropriate functional group of the modifying compound as defined hereinafter may be successfully treated in accordance with this invention. However, the acrylic hydrogels which contain polar functional ester groups currently enjoy the most widespread commercial acceptance. Accordingly, in the description of the invention which follows, specific reference will be made particularly to acrylic ester hydrogels.

The preparation of acrylic ester hydrophilic polymers by copolymerizing, for example, hydroxyethylmethacrylate and ethylene glycol dimethacrylate has long been known, being described in the aforementioned U.S. Pat. Nos. 2,976,576 and 3,220,960. The later patents directed to various modifications of the foregoing basic copolymers include among others, copolymers of the hydroxyalkyl methacrylates with vinyl pyrrolidone as described, for example, in a series of U.S. patents beginning with U.S. Pat. No. 3,503,393 to Seiderman. It is to be understood, however, that while many hydrophilic polymers adapted for the preparation of soft contact lenses contain suitable polar functional groups and thus may be successfully treated in accordance with this invention, neither said hydrophilic polymers per se nor their preparation and/or fabrication into lenses constitute a part of this invention.

To effect the desired structural modification of the polymer hydrogel, a compound having at least one, and preferably two appropriate functional groups is employed. Suitable such compounds include, for example, mono- and polyureas and their corresponding thiourea analogs, diepoxides, aldehydes and dialdehydes, aminoalcohols, aliphatic diols and dithiols, arylene mono- and dihalides, and aliphatic amines, as well as other functional compounds which will be easily recognized as suitable for use herein by those skilled in the art. In treating acrylic ester hydrogels, in particular, the amines are presently preferred because of the comparatively stable modifying linkages formed between polymer and amine functional groups.

Amines which are suitable may be either monoamines or polyamines wherein the organic moiety contains 2-12 carbon atoms. Preferably, these compounds have no other functional group. Particular polyamines suitable herein are those of the ethyleneamine series, e.g., ethylenediamine, diethylenetriamine, triethylenetetramine, tetraethylenepentamine or pentaethylenehexamine; and commercially available higher homologs of the aforesaid ethyleneamines such as propylenediamine (or 1,2-tropanediamine), 1,3-diaminopropane, tetramethylenediamine, hexamethylenediamine and the like. Because of its bifunctionality and comparatively high reactivity, ethylenediamine is presently preferred for use herein. For this reason and also for purposes of convenience, specific reference will be made hereinafter to ethylenediamine. Such specific reference, however, is not to be construed in any way as limiting the invention to the use of only this particular amine.

As described previously, the process of this invention comprises contacting a polymer hydrogel with any one of the aforesaid modifying compounds, e.g. an amine, for a sufficient period of time to effect the desired modification of the polymer. To carry out the process, the soft contact lens material is simply immersed and maintained in the selected compound at a temperature ranging generally from room temperature to about 100° C for a time period ranging from about 5 minutes to about 3 hours. It is to be understood, of course, that for any particular modifying treatment, the most satisfactory reaction time generally will be inversely proportional to the temperature, i.e., the time required to effect the desired degree of modification typically will be shorter as the reaction temperature is increased. Particularly satisfactory results are obtained employing reaction temperatures of 40°-70° C for 1-2 hours. When using ethylenediamine, optimum results presently are obtained employing a temperature of 60° C for a time period of about 2 hours.

In preferred embodiments of this invention employing amines as modifiers, the proportion of amine used to polymer material is not especially critical. Use of excessive amine is advantageous, however, to ensure the desired reaction in the shortest possible time. Likewise, it is preferred to employ undiluted amine, although aqueous solutions which contain at least about 15 parts, by volume, of amine per part of water may optionally be used.

While we do not wish to be bound by any particular theory, polymer modification presently is believed to be effected in the process of this invention by the attachment of functional groups supplied by the modifying compound onto the polymeric chains. In particular, when an acrylic ester hydrogel is treated with an amine under the prescribed reaction conditions, it is believed that preferentially an ester-amine interchange reaction occurs, forming covalent C-N linkages in the polymer structure. This belief is derived from studies of the treated polymers which indicate that the polymer has been modified permanently in the reaction, as through such stable linkages. Modification alternatively through hydrogen bonding, on the other hand, would provide primarily unstable linkages and no permanent modification of the polymer.

Upon completion of the modification reaction herein, the treated polymer lens material is removed from the modifying compound, e.g. an amine, and rinsed well with water, one percent (physiological) saline solution or the like. It is then equilibrated for at least 12 hours in the saline solution (pH-7.4), whereupon the polymer material typically regains any flexibility lost during the modifying treatment. When employing amines as modifying chemicals, the equilibrated polymer finally is soaked in a suitable medium, e.g., water or simulated human tear solution (at physiological pH), until no more detectable amine is leached therefrom. It can readily be understood that the aforesaid lens leaching process is necessary to remove therefrom any unreacted or residual amine which may be irritating or damaging to the eye.

That the process of this invention does indeed modify the surface of the lens material is substantiated by leaching studies of polynmer materials treated with radioactive amines, as shown hereinafter by specific examples. The improved ability of the modified polymer to inhibit the diffusion of e.g. proteins and bacteria compared to untreated lens materials likewise may be indicated by protein diffusion studies carried out by prolonged soaking of treated lenses in simulated human tear solution or other suitable media containing labeled enzymes and/or proteins.

By significantly inhibiting the transmission of opacifying and/or discoloring substances into soft contact lens materials, the process of this invention provides lens products which are greatly improved over those presently available. The treated products of this invention remain clear, transparent, and optically beneficial to the wearer for a longer period of time than is possible with presently used lenses and, accordingly, need be replaced much less often. Likewise, the modified lens products of this invention appear to retain water during use more efficiently than presently used lenses, thereby being extremely resistant to shrinkage or other dimensional change and providing optimum optical acuity to the wearer.

For a fuller understanding of the nature and objects of this invention, the following specific examples are given. These examples are intended merely to illustrate the invention and are not to be construed in a limiting sense. All percentages, proportions and quantities given in these examples are by weight, unless otherwise indicated.

EXAMPLE 1

An acrylic ester polymer hydrogel is prepared by first mixing together in 15 ml ethylene glycol as solvent, 15 ml of a monomer mixture containing, by weight, 95% hydroxyethyl methacrylate (HEMA) and 5% ethylene glycol dimethacrylate, with 0.05 ml of a 6% aqueous solution of ammonium persulfate and 0.05 ml of a 12% aqueous sodium meta-bisulfite. The resulting mixture is placed in a glass plate to a height of 0.009 cm. The plate is sealed with another plate and placed in a vacuum oven wherein copolymerization is conducted at approximately 70° C for 12 hours. Upon cooling, the resulting HEMA polymer film is removed, weighed and then soaked in physiological saline solution for 15 hours. Reweighing of the surface-dried film determines that it has absorbed 36.0% water, comparable to the percentage of water absorbed by a commercially available HEMA polymer soft contact lens similarly tested.

EXAMPLE 2

Radioactive ethylenediamine is prepared by dissolving 300 µCi $^{14}$C-ethylenediamine in 50 ml of non-labeled ethylenediamine. The HEMA hydrogel lens material prepared in Example 1 is cut into samples, 1.27 cm square, which are then immersed in 50 ml of the radioactive ethylenediamine solution for 2 hours at room temperature. The clear, transparent treated lens samples are removed and washed in distilled water for 30 minutes, after which they are equilibrated in 1% saline solution for approximately 15 hours. Comparatively brittle after the ethylenediamine treatment, the lens samples become flexible again upon equilibration.

The equilibrated samples are placed in scintillation fluid for counting of labeled ethylenediamine. An average of 831 disintegrations per minute (dpm) corrected for background and quenching efficiency is obtained, indicating that some reaction has taken place and the diamine has been incorporated within the polymer.

EXAMPLE 3

This example illustrates that diamine has been chemically bound in the polymer lens material by the process of the invention. A simulated human tear solution (physiological pH) is prepared which contains the following ingredients for each 100 ml of aqueous solution:
1.00% sodium chloride
0.06% lysozyme
0.06% albumin
0.04% urea
0.04% γ-globulin
0.04% α-globulin
0.004% glucose The equilibrated lens samples are individually placed in separate vials each containing 2.5 ml of the tear solution. The vials are then positioned and maintained on a shaker apparatus in a water bath for 24 hours at 37° C. At the end of this time period, one ml aliquots of each sample of tear solution are counted for $^{14}$C-ethylenediamine. The lens samples are removed from the sample vials, and successively cleaned in commercial lens cleaning solution and sterilized with boiling in saline solution for 20 minutes in the manner normally preferred daily by a contact lens wearer. Some of these sterilized samples are placed in scintillation fluid and counted for labeled carbon content. The remaining sterilized lens samples are placed in fresh 2.5 ml portions of the tear solution and the aforedescribed storage procedure at 37° C for 24 hours is repeated, followed by counting of $^{14}$C-ethylenediamine in each tear solution, cleaning and sterilization of the lens samples and labeled carbon counts of some of these. This same procedure is carried out for at least 40 days, employing fresh tear solution in each leaching cycle, while cleaning and sterilizing the lens samples after each cycle. Using this procedure, remaining $^{14}$C-ethylenediamine in the lens samples is counted with the following results:

TABLE 1

| No. of days in tear solution | Average $^{14}$Carbon count in lens sample (dpm)* |
|---|---|
| 1 | 225 |
| 2 | 150 |
| 3 | 78 |
| 4 | 62 |
| 5 | 54 |
| 10 | 51 |
| 15 | 37 |
| 20 | 35 |
| 40 | 36 |

*dpm = disintegrations per minute

The above results indicate that a major portion of unreacted free diamine is removed from the lens samples with soaking in saline solution for up to 48 hours. Thereafter, any remaining extractable amine is removed slowly by leaching the lens material over a period of 12–13 days. After a total of 15 days leaching, the average $^{14}$C-ethylenediamine content of the lens samples is 35 dpm/lens, which count then remains constant with continued leaching for 24 additional days. This count represents the amount of diamine permanently bound in the lens material.

EXAMPLE 4

A lightly cross-linked hydrophilic HEMA polymer is prepared in a series of experiments conducted as outlined generally in Example 1 above. In these reactions, however, the monomer mixture used contains 15 ml of 99% hydroxyethyl methacrylate and 1.5 ml of ethylene glycol dimethacrylate. The redox initiator requirement in each instance is supplied by 0.2 ml each of the ammonium persulfate and sodium meta-bisulfite solutions described in Example 1. Each copolymerization reaction is conducted for 7 hours at 65°–75° C.

After being successively dried for 2 hours at 45° C, tared and then equilibrated in saline solution for 15 hours, the prepared hydrophilic polymer converts to a polymer hydrogel, absorbing 35.9% water. A commercial soft contact lens (SOFLENS, a HEMA-type polymer lens manufactured by Bausch and Lomb, Inc.) is similarly dried, tared and equilibrated in saline solution to determine the amount of water incorporated in the commercial soft contact lens. This lens material is found to absorb 37.3% water, similar to the amount absorbed by the polymer hydrogel of this example.

EXAMPLE 5

Following the general procedure as outlined in Example 2 above, samples of the HEMA polymer hydrogels of Example 4 are immersed in the radioactive ethylenediamine solution for varying times at different temperatures.

After treatment, $^{14}$C-ethylenediamine counts are determined for samples of the treated lens materials after being equilibrated and boiled in saline solution for 2 hours. Results obtained are as follows:

TABLE 2

| $^{14}$C-Amine Treatment | | Average $^{14}$Carbon count |
|---|---|---|
| Temperature | Time | in lens sample (dpm)* |
| 40 | 30 | 20,338 |
|  | 60 | 31,019 |
|  | 120 | 56,082 |

TABLE 2-continued

| $^{14}$C-Amine Treatment | | Average $^{14}$Carbon count |
|---|---|---|
| Temperature | Time | in lens sample (dpm)* |
| 60 | 30 | 40,810 |
|  | 60 | 52,316 |
|  | 120 | 70,760 |
| 70 | 30 | 42,432 |
|  | 120 | 29,394 |

*As described previously.

The treated lens samples are then subjected to extended leaching in simulated tear solution as described in Example 3. Throughout the leaching period, aliquots of the tear solution are counted daily along with periodic counting of the lens material. After 15 days leaching, $^{14}$C-ethylenediamine counts on the lens materials are as follows:

TABLE 3

| $^{14}$C-Amine Treatment | | Average $^{14}$Carbon count in |
|---|---|---|
| Temperature | Time | leached lens samle (dpm) |
| 40 | 30 | 50 |
|  | 60 | 68 |
|  | 120 | 68 |
| 60 | 30 | 88 |
|  | 60 | 71 |
|  | 120 | 150 |
| 70 | 30 | 140 |
|  | 120 | 34 |

The foregoing results indicate that the polymer truly becomes modified by the amine treatment, and further, that the greatest degree of modification appears effected with amine treatment at 60° C for approximately 2 hours.

We claim:

1. A process for producing a soft contact lens resistant to the diffusion and accumulation therein of substances which will promote its clouding and discoloration in use which comprises treating a soft contact lens acrylic ester hydrogel with a compound selected from the group consisting of aliphatic dithiols and aliphatic amines, each of said compounds containing at least one functional group reactive with the polar functional groups in said acrylic ester hydrogel, the treatment being conducted for a sufficient period of time to structurally modify at least a major portion of polymer molecules on the outer surfaces of the hydrogel by incorporating therein the modifying compound through its functional groups.

2. The process of claim 1 which is conducted at a temperature ranging from room temperature to 100° C for a time period ranging from 5 minutes to 3 hours.

3. The process of claim 1 which is conducted at a temperature of 40°-70° C.

4. The process of claim 1 wherein the polymer modifying compound is an aliphatic amine wherein the organic moiety contains 2-12 carbon atoms.

5. The process of claim 4 wherein the aliphatic amine is ethylenediamine.

6. The process of claim 1 wherein the acrylic ester hydrogel is a lightly cross-linked copolymer formed by copolymerizing a major portion of hydroxyethyl methacrylate with a minor portion of at least one bifunctional ester of acrylic or methacrylic acid.

7. The process of claim 5 wherein ethylenediamine is employed at a temperature of 60° C for a time period of 2 hours.

8. A soft contact lens acrylic ester hydrogel prepared according to the process of claim 1 which is resistant to the diffusion and accumulation therein of substances causing clouding and discoloration thereof in use.

* * * * *